UNITED STATES PATENT OFFICE.

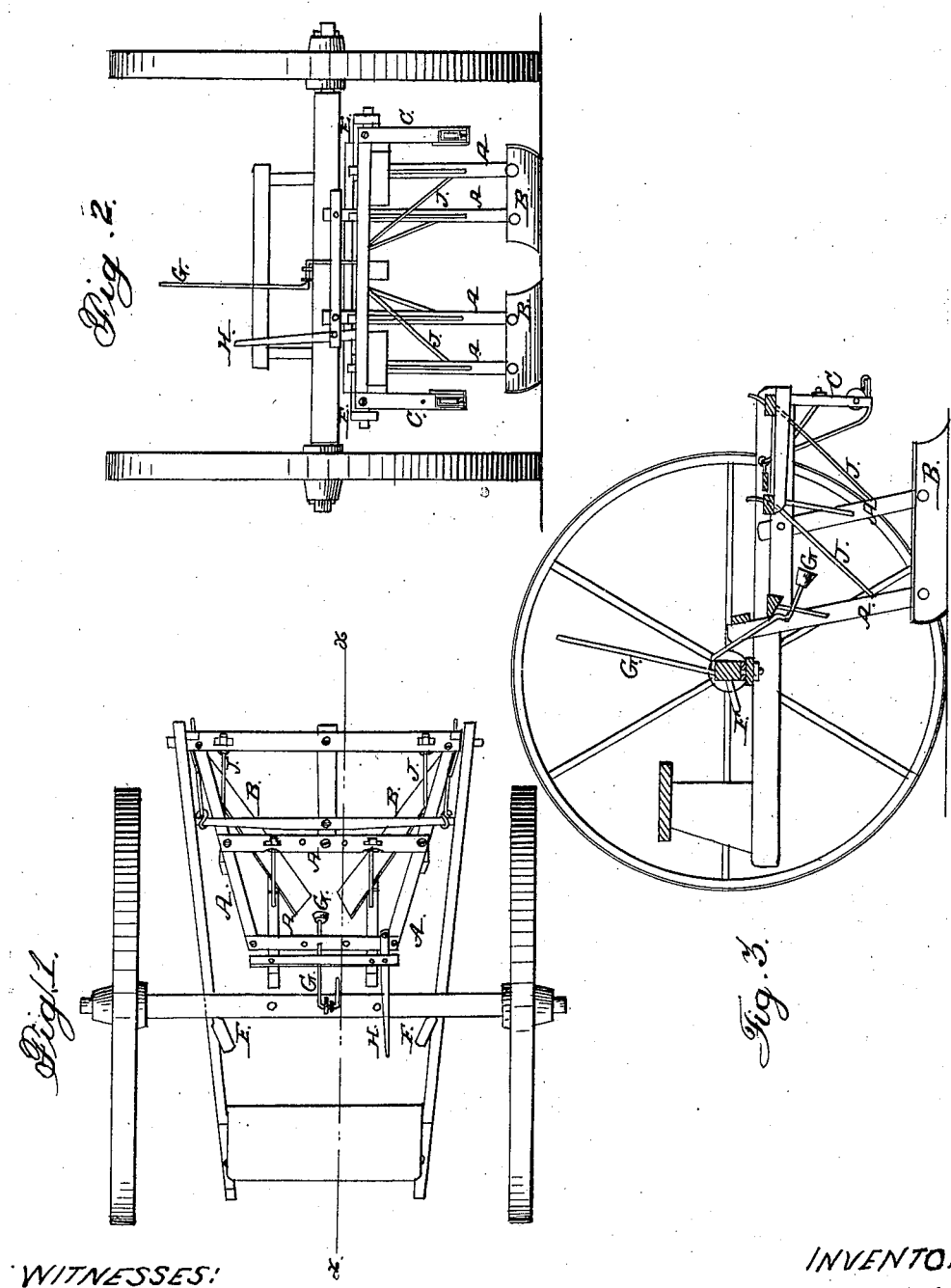

WM. D. FISHER, OF FREEPORT, ILLINOIS.

IMPROVEMENT IN CULTIVATORS.

Specification forming part of Letters Patent No. 54,317, dated May 1, 1866.

*To all whom it may concern:*

Be it known that I, W. D. FISHER, of Freeport, Stephenson county, State of Illinois, have invented new and useful Improvements in Cultivators; and I do hereby declare the following to be an exact description thereof, reference being had to the accompanying drawings, and to the letters of reference marked thereon, making a part of this specification.

Figure 1 represents a top view; Fig. 2, a front view; Fig. 3, a side elevation.

The nature of my invention consists in the arrangement and combination of the movable frame with its spring-fenders and attachment to the single-tree and the mode of controlling the carriage and plows.

A are the plow beams and frame; B, the scrapers to perform the last plowing to corn, by which the soil is moved from the middle and covers up all the grass and weeds around the corn. This avoids plowing close to the corn or injuring the roots, as the common shovel does.

C C, the drops. The iron rods for draft operate on pulleys in the ends of the drops C, and extend back to the single-tree d, that is an equalizer, and with the seat of the driver, with the driver's weight poised, take off the draft from the horses' necks, which has ever been a disadvantage in using scrapers.

F F are the pressure-boards, operated by the driver's feet, while the bolster E, pivoted in the center by a king-bolt to the carriage-axle, enables the driver to control the carriage with his feet with perfect ease.

The rod G is a curved lever operating on the axle by means of staples, and extends forward and downward under the hind cross-bar of the frame, and bent or knobbed at the end to hold up the machine when hoisted, without the aid of the driver's hand, to the top of the lever that is in front of him, to give him easy control of the lever when necessary.

H is a lever that enables the driver to raise the scrapers from the ground to free them from dirt.

J J are fenders, made of rod-iron, and bent so as to form a perfect protection from the clods, and with flat tops that operate in the frame as springs, to enable the scrapers to yield and adjust themselves to any unequal surfaces in the ground.

My machine is intended to be put together with bolts and nuts, and not a mortise or tenon.

What I claim as my invention, and desire to secure by Letters Patent, is—

The arrangement and combination of the drops C, equalizer E, adjustable frame A, regulating-lever G, and fenders J, when arranged as herein described, and for the purposes set forth.

W. D. FISHER.

Witnesses:
JOHN C. KEAN,
JOSEPH EMMETT.